US010212153B2

(12) United States Patent
Hintermeister

(10) Patent No.: US 10,212,153 B2
(45) Date of Patent: *Feb. 19, 2019

(54) PROVIDING DATA SECURITY WITH A TOKEN DEVICE

(71) Applicant: International Business Machines Corporation, Armonk, NY (US)

(72) Inventor: Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/493,319

(22) Filed: Apr. 21, 2017

(65) Prior Publication Data
US 2017/0223007 A1    Aug. 3, 2017

Related U.S. Application Data

(63) Continuation of application No. 14/669,027, filed on Mar. 26, 2015, now Pat. No. 9,667,621, which is a
(Continued)

(51) Int. Cl.
*H04L 29/06* (2006.01)
*H04W 12/08* (2009.01)
(Continued)

(52) U.S. Cl.
CPC ........ *H04L 63/083* (2013.01); *G06F 21/6218* (2013.01); *H04L 9/0863* (2013.01);
(Continued)

(58) Field of Classification Search
CPC ... H04L 63/083; H04L 9/0863; H04L 9/3226; H04L 2209/80; H04W 12/08;
(Continued)

(56) References Cited

U.S. PATENT DOCUMENTS 7,200,869 B1 * 4/2007 Hacherl .............. G06F 12/1433
707/999.201
8,856,917 B2   10/2014 Das et al.
(Continued)

FOREIGN PATENT DOCUMENTS

EP          2651094 A2    10/2013

OTHER PUBLICATIONS

Limer, "Piston Cloud Key Fits The Cloud on a USB Drive", The Mary Sue, Sep. 29, 2011, pp. 1-4. http://www.themarysue.com/cloud-usb-stick.

(Continued)

*Primary Examiner* — Joseph P Hirl
*Assistant Examiner* — J. Brant Murphy
(74) *Attorney, Agent, or Firm* — Robert J. Shatto

(57) ABSTRACT

A computer-implemented method for providing security to access and store data may include transferring first information for display from a token device having a memory to a first computing device at a first time, the token device connected to the first computing device and the first information describing public data stored on the token device. A request to retrieve a root directory of private data may be received, the request specifying a root directory name. In response to receiving the request to retrieve a root directory of private data, the root directory may be requested by establishing a wireless connection between the token device and a server computing device, transferring the root directory name to the server computing device, wherein the root directory name is used as a password to retrieve the root directory, and receiving the root directory from the server computing device by the token device.

17 Claims, 7 Drawing Sheets

Related U.S. Application Data continuation of application No. 14/607,452, filed on Jan. 28, 2015, now Pat. No. 9,544,301.

(51) Int. Cl.
*G06F 21/62* (2013.01)
*H04L 9/08* (2006.01)
*H04L 9/32* (2006.01)

(52) U.S. Cl.
CPC ........ *H04L 9/3226* (2013.01); *H04L 63/0853* (2013.01); *H04W 12/08* (2013.01); *H04L 2209/80* (2013.01)

(58) Field of Classification Search
CPC .. G06F 21/6218; G06F 3/044; G06F 15/0291; G06F 3/0485; G06F 3/0484; G06F 17/30657; G06F 17/30882; G06F 17/30014; G06F 17/3064; G06F 17/30011; G06F 3/04817; G06F 3/0482; G06F 3/0483; G06F 3/04842; G06F 3/0488; G06F 2203/04806; G06F 2203/04103; G06K 9/2054

See application file for complete search history.

(56) References Cited

U.S. PATENT DOCUMENTS

| | | | |
|---|---|---|---|
| 9,225,707 B1* | 12/2015 | de Sousa | G06F 21/629 |
| 2005/0102509 A1* | 5/2005 | Fascenda | G06Q 20/02 |
| | | | 713/165 |
| 2005/0177793 A1* | 8/2005 | Yoda | G06F 3/0482 |
| | | | 715/741 |
| 2005/0204127 A1* | 9/2005 | Dive-Reclus | G06F 21/6218 |
| | | | 713/152 |
| 2007/0113294 A1* | 5/2007 | Field | H04L 63/083 |
| | | | 726/27 |
| 2007/0294538 A1 | 12/2007 | Lim et al. | |
| 2008/0065887 A1* | 3/2008 | Grove | G06F 21/31 |
| | | | 713/168 |
| 2008/0281165 A1* | 11/2008 | Rai | A61B 5/0002 |
| | | | 600/300 |
| 2009/0156134 A1* | 6/2009 | Regen | G06F 3/0605 |
| | | | 455/73 |
| 2009/0327696 A1* | 12/2009 | Hatlelid | H04L 63/0823 |
| | | | 713/151 |
| 2010/0299313 A1* | 11/2010 | Orsini | H04L 9/085 |
| | | | 707/652 |
| 2012/0166818 A1* | 6/2012 | Orsini | H04L 9/085 |
| | | | 713/193 |
| 2013/0125225 A1 | 5/2013 | Candelore | |
| 2013/0150000 A1* | 6/2013 | Wong | H04L 63/0807 |
| | | | 455/411 |
| 2013/0239204 A1* | 9/2013 | Das | G06F 9/452 |
| | | | 726/18 |
| 2013/0268767 A1* | 10/2013 | Schrecker | G06F 21/31 |
| | | | 713/185 |
| 2014/0013409 A1 | 1/2014 | Halageri | |
| 2014/0019753 A1* | 1/2014 | Lowry | H04L 63/062 |
| | | | 713/155 |
| 2014/0050317 A1 | 2/2014 | Sabin | |
| 2014/0164624 A1 | 6/2014 | Ames et al. | |
| 2014/0164774 A1* | 6/2014 | Nord | G06F 21/602 |
| | | | 713/171 |
| 2014/0208410 A1* | 7/2014 | Dellago, Jr. | H04L 63/0853 |
| | | | 726/9 |
| 2015/0264105 A1* | 9/2015 | V | H04L 67/02 |
| | | | 709/201 |
| 2016/0219033 A1 | 7/2016 | Hintermeister | |
| 2016/0219034 A1 | 7/2016 | Hintermeister | |

OTHER PUBLICATIONS

Mell et al., "The NIST Definition of Cloud Computing", Recommendations of the National Institute of Standards and Technology, U.S. Department of Commerce, Sep. 2011, Gaithersburg, MD, 7 pages.

Naraine, "URL rewriting can help thwart Web app attacks", ZDNet, Feb. 27, 2009, pp. 1-9. http://www.zdnet.com/blog/security/url-rewriting-can-help-thwart-web-app-attacks/2728.

Yu et al., "Achieving Secure, Scalable, and Fine-grained Data Access Control in Cloud Computing", INFOCOM, 2010 Proceedings IEEE, Mar. 2010, pp. 1-9, Copyright © 2010, IEEE. DOI: 10.1109/INFCOM.2010.5462174.

Unknown, "Encrypted Drives", Kingston, 2014, pp. 1-2, http://www.kingston.com/us/usb/encrypted_security#dtvp30.

Unknown, "HID Global Provides Strong Two Factor Authentication with USB Security Tokens", HID Global Corporation/ASSA ABLOY AB, p. 1, (printed Oct. 23, 2014), Copyright © 2014. https://info.hidglobal.com/201403NAMPPContactUs_IdentityAssurance.

Unknown, "CloudUSB Computer", Antonio & Gianluca Moro, Oct. 2014, p. 1, Copyright © 2010. http://cloudusb.net.

List of IBM Patents or Patent Applications Treated as Related, Signed Apr. 21, 2017, 2 pages.

\* cited by examiner

PROVIDING DATA SECURITY WITH A TOKEN DEVICE

BACKGROUND

This disclosure relates generally to providing security to access and store data, and more specifically, to providing security with a token device.

Authentication and authorization are vital elements in cloud security. Authentication is the process that allows a system to identify a user and then validate the user's identity through an entry access code (i.e., a password). Various methods have been generated to improve the authentication process. For example, before a password is stored on a server, a password may be encrypted. Accordingly, unauthorized users may not able to decipher the password unless the unauthorized users have a corresponding key to decrypt the password. A second method with various iterations is called hashing. Hashing is similar to encryption in that the user password is converted into a random string of text. However, hashes cannot be converted back into a password. Unauthorized users may perform what is known as a brute force attack. This is where every conceivable word is converted into a hash. Unauthorized users may then check to see if the hash is listed on their list of stolen accounts, and if the hash is listed, the corresponding password is discovered.

SUMMARY

One or more embodiments are directed to a computer-implemented method for providing security to access and store data. The method can include transferring first information for display from a token device having a memory to a first computing device at a first time, the token device connected to the first computing device and the first information describing public data stored on the token device. The method can further include receiving a request to retrieve a root directory of private data, the request specifying a root directory name. In response to receiving the request to retrieve a root directory of private data, the method may also include requesting the root directory by establishing a wireless connection between the token device and a server computing device, and transferring the root directory name to the server computing device. The root directory name is used as a password to retrieve the root directory. The method may further include receiving the root directory from the server computing device by the token device. One or more embodiments are directed to a token device for providing security to access and store data. The token device may include a memory, a private data conceal engine, a radio, and a cryptosystem. The private data conceal engine may be configured to transfer first information for display from the token device to a first computing device at a first time. The token device may be connected to the first computing device at the first time. The first information may describe public data stored on the token device. The radio may be configured to establish a wireless connection between the token device and a server computing device. The token device may receive a request to retrieve a root directory of private data. The request may specify a root directory name and in response to the receiving of the request, the token device can request the root directory from the server computing device and receive the root directory from the server computing device. The cryptosystem can be configured to transfer the root directory name to the server computing device. The root directory name is used as a password to retrieve the root directory from the server computing device.

One or more embodiments are directed to a computer program product. The computer program product comprises a computer readable storage medium having program code embodied therewith. The program code comprises computer readable program code that may be configured for transferring first information for display from a token device having a memory to a first computing device at a first time, the token device connected to the first computing device and the first information describing public data stored on the token device. In addition, the computer readable program code may be configured for receiving a request to retrieve a root directory of private data, the request specifying a root directory name. In response to receiving the request to retrieve a root directory of private data, the computer program readable program code may also be configured for requesting the root directory by establishing a wireless connection between the token device and a server computing device, and transferring the root directory name to the server computing device, wherein the root directory name is used as a password to retrieve the root directory. The computer program readable program code may also be configured for receiving the root directory from the server computing device by the token device.

Figure 1:
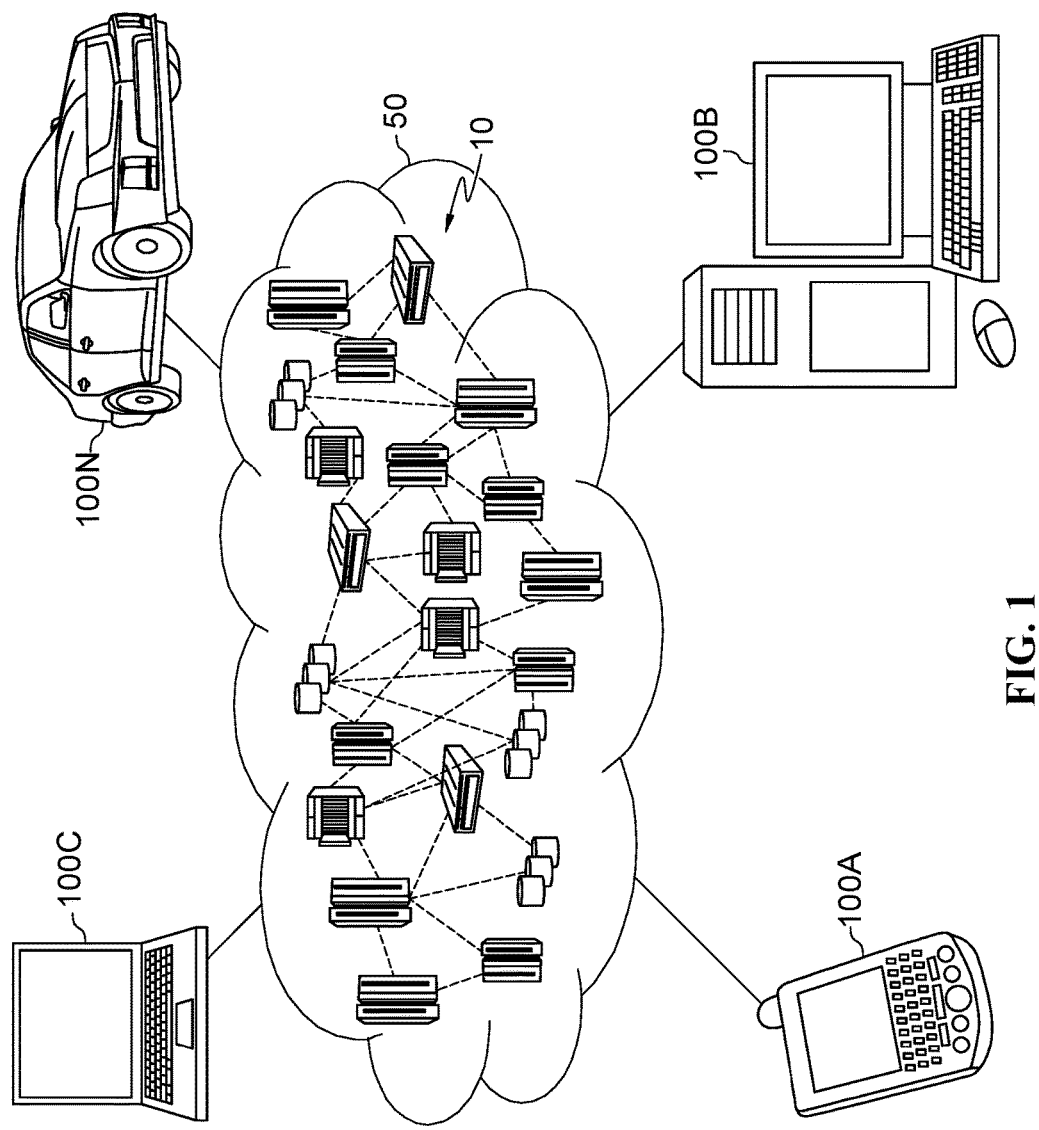
FIG. 1 depicts a cloud computing environment according to an embodiment of the present invention.

In the Figures and the Detailed Description, like numbers refer to like elements. The drawings included in the present application are incorporated into, and form part of, the specification. They illustrate embodiments of the present invention and, along with the description, serve to explain the principles of the invention. The drawings are only illustrative of certain embodiments and do not limit the invention. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Users may be exposed to unauthorized access of private data stored on cloud drives (i.e., cloud provider servers). Consequently, users may be hesitant to utilize cloud storage drives to store sensitive data. Cloud storage security systems today may utilize various methods to ensure data security. For example, before a password is stored on a server, a password may be encrypted. Accordingly, unauthorized users may not able to decipher the password unless the unauthorized users have a corresponding key to decrypt the password. As discussed, a second method to ensure data security is hashing. The success of these and other authentication security methods may require users to generate strong passwords, change passwords often, and not use the same passwords for different accounts. Moreover, cloud computing providers may only require a single password credential for users. Consequently, when an unauthorized access of private data has occurred, an entire collection of directories (i.e., folders) of private data may be available. Further, if a user wants to manage private data directly through a web browser, the web browser may retain a URL address footprint that may include passwords and other sensitive information.

One method of maintaining the security of sensitive information is to not utilize cloud storage drives, but simply store data on a Universal Serial Bus (USB) flash drive. However, this may nullify the benefits of cloud storage, such as the ability to access private data from any location. Moreover, if an unauthorized user stole the USB flash drive, the unauthorized user may simply connect the flash drive to a computing device and have full access to all of the viewable private data. Further, the user may easily lose the USB flash drive. Accordingly, various embodiments of the present disclosure are directed to providing security to access and store data by utilizing a token device (e.g., a USB flash drive device with wireless capability) such that a user may manually input a directory name on the token device drive to retrieve the corresponding directory. The directory name may be utilized as a password to authenticate the user's identity. Consistent with some embodiments, after a server computing device authenticates a user's identity, the directory may be sent to the token device such that a computing device that the token device is connected to displays the directory name on the token device (i.e., the directory becomes visible and accessible after authentication). In some embodiments, the token device may generate a unique compressed uniform resource locator (URL) each time a link, which corresponds to the compressed URL, is selected to open a directory of private data in a browser such that there is no URL footprint to retrieve sensitive data by unauthorized users. In various embodiments, the token device may be configured to alter how much of a total storage capacity is visible using a public storage feature and how much of the total storage capacity is not visible.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 100A, desktop computer 100B, laptop computer 100C, and/or automobile computer system 100N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 100A-N shown in FIG. 2 are intended to be illustrative only and that computing nodes 10 and cloud computing environment 50 can communicate with any type of computerized device over any type of network and/or network addressable connection (e.g., using a web browser).

Figure 2:
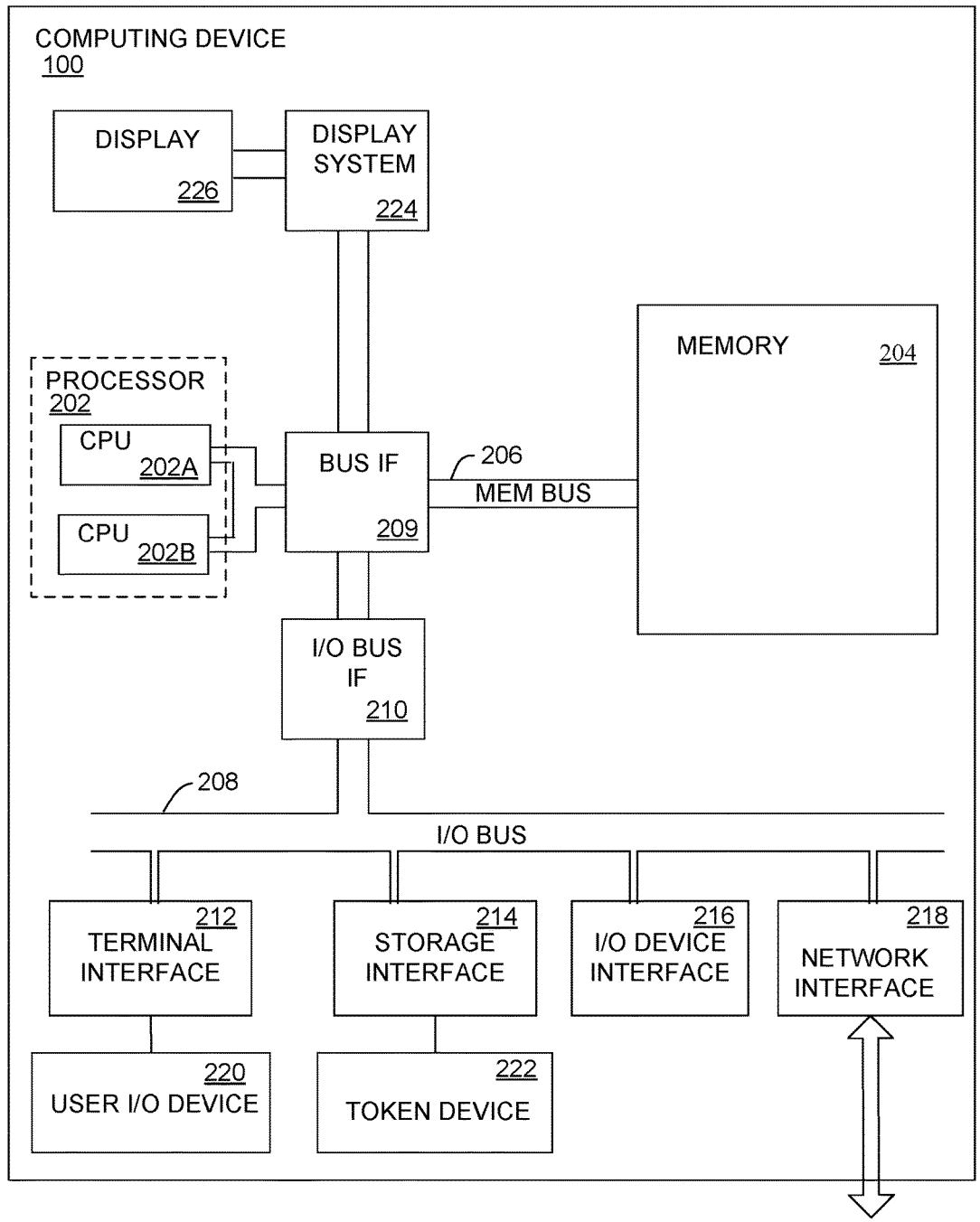
FIG. 2 is a block diagram example of a computing device, which includes a token device, according to embodiments.

FIG. 2 is a block diagram example of a computing device (100A-N), which includes a token device, according to various embodiments. The mechanisms and apparatus of the various embodiments disclosed herein apply equally to any appropriate computing device. The major components of the computing device 100 include one or more processors 202, a memory 204, a terminal interface 212, a storage interface 214, an Input/Output ("I/O") device interface 216, and a network interface 218, all of which are communicatively coupled, directly or indirectly, for inter-component communication via a memory bus 206, an I/O bus 208, bus interface unit ("IF") 209, and an I/O bus interface unit 210.

The computing device 100 may contain one or more general-purpose programmable central processing units (CPUs) 202A and 202B, herein generically referred to as the processor 202. In an embodiment, the computing device 100 may contain multiple processors; however, in another embodiment, the computing device 100 may alternatively be a single CPU device. Each processor 202 executes instructions stored in the memory 204 and may include one or more levels of on-board cache.

In an embodiment, the memory 204 may include a random-access semiconductor memory, token device 222 memory, or storage medium (either volatile or non-volatile) for storing or encoding data and programs. In another embodiment, the memory 204 represents the entire virtual memory of the computing device 100, and may also include the virtual memory of other computer systems coupled to the computing device 100 or connected via a network 250. The memory 204 is conceptually a single monolithic entity, but in other embodiments the memory 204 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

Figure 4:
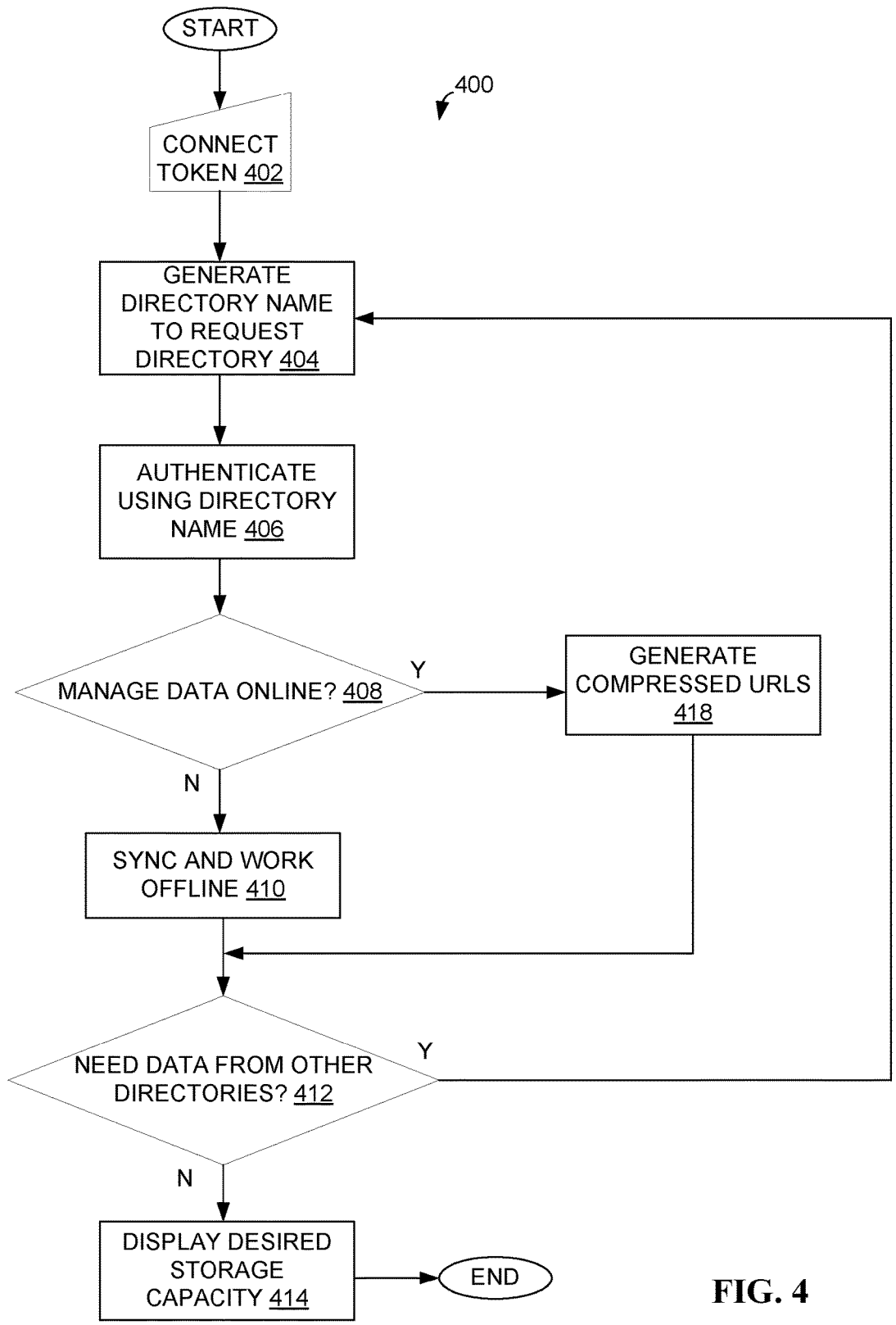
FIG. 4 is a flow diagram of an example process for securely accessing and storing private data using the token device, according to embodiments.

The memory 204 may store all or a portion of the components and data shown in FIG. 4. These programs and data structures are illustrated in FIG. 4 as being included within the token device 222, however, in other embodiments, some or all of them may be on different computer systems and may be accessed remotely, e.g., via a network 250. The computing device 100 may use virtual addressing mechanisms that allow the programs of the computing device 100 to behave as if they only have access to a large, single storage entity instead of access to multiple, smaller storage entities. Thus, while the components and data shown in FIG. 4 are illustrated as being included within the token device 222, these components and data are not necessarily all completely contained in the same token device 222 at the same time. Further, although the components and data shown in FIG. 4 are illustrated as being separate entities, in other embodiments some of them, portions of some of them, or all of them may be packaged together.

In an embodiment, the components and data shown in FIG. 4 may include instructions or statements that execute on the processor 202 or instructions or statements that are interpreted by instructions or statements that execute on the processor 202 to carry out the functions as further described below. In an embodiment, the components shown in FIG. 4 may include data in addition to instructions or statements.

The computing device 100 may include a bus interface unit 209 to handle communications among the processor 202, the memory 204, a display system 224, and the I/O bus interface unit 210. The I/O bus interface unit 210 may be coupled with the I/O bus 208 for transferring data to and from the various I/O units. The I/O bus interface unit 210 communicates with multiple I/O interface units 212, 214, 216, and 218, which are also known as I/O processors (IOPs) or I/O adapters (IOAs), through the I/O bus 208. The display system 224 may include a display controller, a display memory, or both. The display controller may provide video, audio, or both types of data to a display device 226. The display memory may be a dedicated memory for buffering video data. The display system 224 may be coupled with a display device 226, such as a standalone display screen, computer monitor, television, or a tablet or handheld device display. In an embodiment, the display device 226 may include one or more speakers for rendering audio. Alternatively, one or more speakers for rendering audio may be coupled with an I/O interface unit. In alternate embodiments, one or more of the functions provided by the display system 224 may be on board an integrated circuit that also includes the processor 202. In addition, one or more of the functions provided by the bus interface unit 209 may be on board an integrated circuit that also includes the processor 202.

The I/O interface units support communication with a variety of storage and I/O devices. For example, the terminal interface unit 212 supports the attachment of one or more user I/O devices 220, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 220 and the computing device 100, and may receive output data via the user output devices. For example, a user interface may be presented via the user I/O device 220, such as displayed on a display device, played via a speaker, or printed via a printer.

The storage interface 214 supports the attachment of one or more disk drives or direct access token devices 222 (which may be rotating magnetic disk drive token devices 222, although they could alternatively be arrays of disk drives configured to appear as a single large storage device to a host computer, or solid-state drives, such as flash memory). In another embodiment, the token device 222 may be implemented via any type of secondary storage device. The contents of the memory 204, or any portion thereof, may be stored to and retrieved from the token device 222 as needed. The I/O device interface 216 provides an interface to any of various other I/O devices or devices of other types, such as printers or fax machines. The network interface 218 provides one or more communication paths from the computing device 100 to other digital devices and computer systems, such as database servers. These communication paths may include, e.g., one or more networks 250.

Although the computing device 100 shown in FIG. 2 illustrates a particular bus structure providing a direct communication path among the processors 202, the memory 204, the bus interface 209, the display system 224, and the I/O bus interface unit 210, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 210 and the I/O bus 208 are shown as single respective units, the computing device 100 may, in fact, contain multiple I/O bus interface units 210 and/or multiple I/O buses 208. While multiple I/O interface units are shown, which separate the I/O bus 208 from various communications paths running to the various I/O devices, in other embodiments, some or all of the I/O devices are connected directly to one or more system I/O buses.

In various embodiments, the computing device 100 may be implemented as a desktop computer, portable computer, laptop or notebook computer, tablet computer, pocket computer, telephone, smart phone, or any other suitable type of electronic device.

FIG. 2 is intended to depict the representative major components of the computing device 100. Individual components, however, may have greater complexity than represented in FIG. 2, components other than or in addition to those shown in FIG. 2 may be present, and the number, type, and configuration of such components may vary. Several particular examples of additional complexity or additional variations are disclosed herein; these are by way of example only and are not necessarily the only such variations. The various program components illustrated in FIG. 2 may be implemented, in various embodiments, in a number of different manners, including using various computer applications, routines, components, programs, objects, modules, data structures, etc., which may be referred to herein as "software," "computer programs," or simply "programs."

Figure 3:
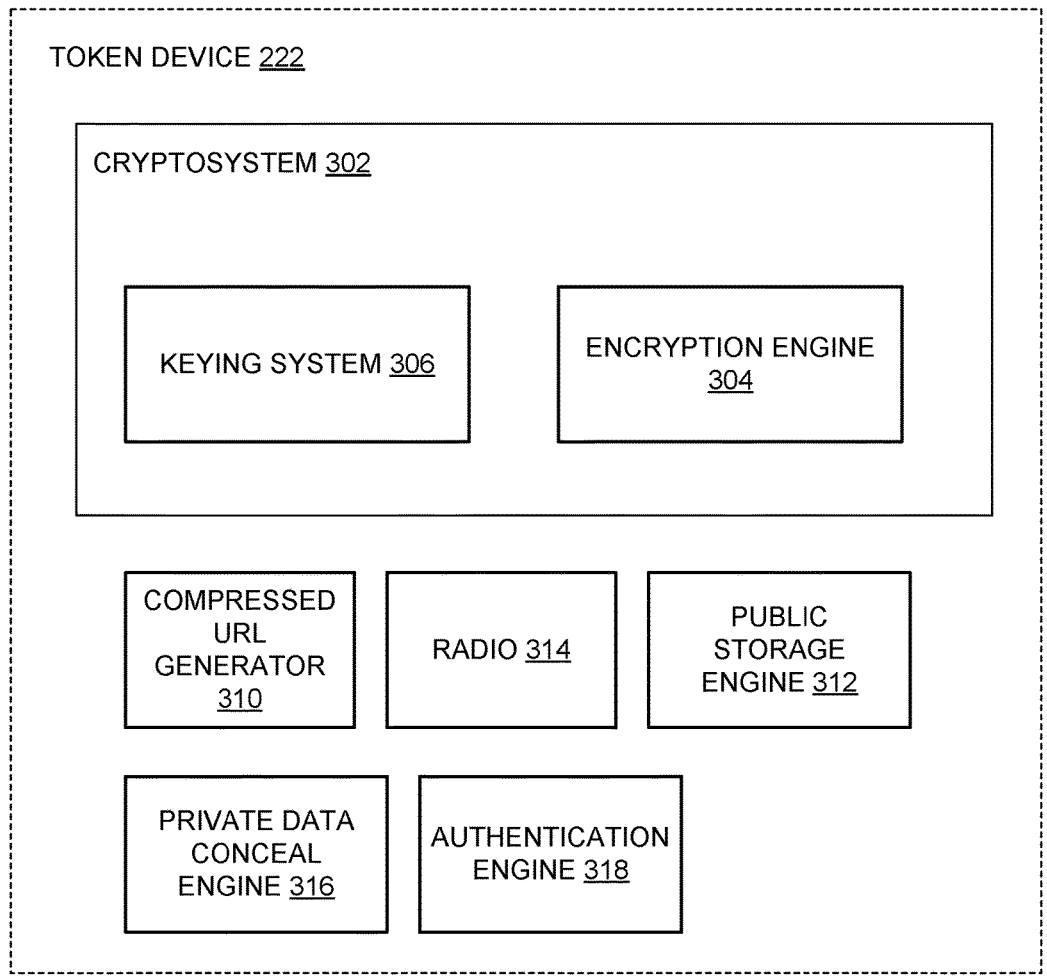
FIG. 3 is a block diagram of an example token device of FIG. 2, and the components and data that can reside therein, according to embodiments.

FIG. 3 is a block diagram of an example token device 222 of FIG. 2, and the components and data that can reside therein, according to embodiments. In an embodiment the token device 222 may include a cryptosystem 302, which may further include an encryption engine 304 and a keying system 306 to perform various operational procedures. The token device 222 may also include a compressed URL generator 310, a radio 314, a private/public storage engine 312, a private data conceal engine 316, and an authentication engine 318.

In one embodiment, the token device 222 may be a universal serial bus (USB) token, which includes flash memory. Alternatively, the token device 222 may be a smart card, also known as an integrated circuit card. In this embodiment, a smart card reader (or reader/writer) and smart card driver may be utilized in conjunction with the smart card to read the smart card. In various embodiments, the token device 222 may be a contactless token device 222. A contactless token device 222 does not require physical connection with the computing device, but rather a logical connection is made to the computing device. For example, a smart card may be placed at a particular distance from the smart card reader, and the smart card reader may scan (read) the smart card to make a logical connection to the computing device.

A cryptosystem 302 is a system of encoding and decoding private data with an algorithm such that unauthorized users may not easily access private data. An encryption engine 304 may initiate encryption of the directory name or directory files using various algorithms, and the keying system 306 may create and manage keys that encrypt or decrypt the directory name or directory files. The encryption engine 304 and keying system 306 may be combined to form various methods of authenticating a user's identity using the generated directory name, as discussed more below.

A compressed URL generator 310 may be utilized if the user chooses to manage data files directly from a web browser. The compressed URL generator 310 may generate a URL each time a link, which corresponds to the compressed URL, is selected to open the one or more data files in a browser. The compressed URL generator 310 may be utilized to hide the presence of URL footprints such that unauthorized users may not be able to track the directory names or other sensitive information.

A radio 314 may be included in the token device 222 to establish a wireless connection between the token device 222 and a server computing device. This may be utilized in order for the token device 222 to request one or more directories by transferring the corresponding directory name to the server computing device. The directory name may be used as a password to retrieve the corresponding directory. The server computing device may also communicate with the radio 314 to authenticate the user's identity. The token device 222 may further include a switch to turn the wireless capability on and off such that a user may choose to manage data online or offline. The radio 314 may include a transmitter to send requests using the directory name, a receiver to read signals from the server computing device, and antenna to receive and send the requests.

The token device 222 may include a public storage engine 312 to allow for displaying a public storage. The display of the public storage may show a total storage capacity that is less than the actual total storage capacity of the token device 222 and the display of the public storage shows only the public data stored on the token device 222. The token device 222 may be configurable to alter how much of the total storage capacity is displayed for the public storage.

The private data conceal engine 316 may be utilized when the token device is first connected to the computing device before a root directory has been generated and/or when directories of data have been stored on the token device 222. If the token device 222 is synchronized with the server computing device to store a directory from the server computing device to the token device, the user may be able to retrieve the directory from the token device instead of a server computing device. In an embodiment, the user may connect the token device 222 to a computing device. The token device 222 may then transfer information for display to the computing device. However, the information may only describe public data stored on the token device (e.g., the user sees an empty drive), even though the private data of directories are stored on the token device 222. This may be possible through the private data conceal engine 316. In one embodiment, the data conceal engine 316 may conceal the directories of data such that the directories are not viewable on a computing device display screen. The private data conceal engine 316 may conceal the directories by encrypting them, marking them as hidden, and reveal them to the display screen as soon as the authentication engine 318 or other server computing device verifies that the directory name generated by the user matches the name of the corresponding directory. In some embodiments, when the authentication engine 318 verifies that the generated name matches the directory name, the data conceal engine 316 may then transfer the private information in the root directory stored on the token device to a display screen of the computing device. Accordingly, the display screen may not only show the public data, but the user's private directories of data as well.

Alternatively, the token device 222 may conceal the directories of data by providing a private encrypted file system and a public file system. The public file system may include the public data and the private encrypted file system may include the private directories of data. Accordingly, when the public file system displays a generated directory name that matches the name of the corresponding directory (i.e., it has been authenticated by the authentication engine 318), the public file system may decrypt and expose the hidden directory of private data stored in the encrypted file system. In another embodiment, the token device 222 may be partitioned such that the private directories of data are in a separate encrypted partition, which is hidden from a public partition until the authentication engine 318 verifies that the generated directory name matches the name of the corresponding directory name. In other embodiments, an operating system of the computing device that is connected to the token device 222 may conceal the presence of the private directories of data until the authentication engine 318 performs the verification.

FIG. 4 is a flow diagram of an example process 400 for securely accessing and storing private data using a token device, according to embodiments. In an embodiment, the process 400 may begin with operation 402 when a user connects a token device having memory into a computing device. In an embodiment, the token device may then transfer information for display to the computing device. The information displayed on the computing device may only show public data that is stored on the token device. For example, the public data may include storage capacity indicators (e.g., 10 gigabytes left for storage), the name of a manufacturing company of the token device 222, or any other public data that is not private data. Private data is considered to be directories (i.e., folders), directory names, data files that correspond thereto, or any data that a user considers to be private. Private data may be any data designated by a user as private data.

In an embodiment, the user may generate (e.g., type a request to create a directory on the token device) a root directory name on token device drive to request a corresponding root directory of private data. The token device may receive this request to retrieve a root directory of private data from the user and perform operation 404 to request the root directory from a remote server computing device by establishing a wireless connection between the token device and the server computing device and transferring the root directory name to the server computing device. The root directory name may be used as a password to retrieve the root directory. Accordingly, the server computing device may perform operation 406 to authenticate the user's identity by using the directory name. The token device may then receive the root directory from the server computing device. In an embodiment, when the token device receives the directory, the directory becomes visible on the display screen of the computing device and the user may accordingly manage the private data within the directory.

In operation 408, a user may decide whether it wants to manage the private data online, or whether the user wants to perform operation 410 to synchronize the token device with the server computing device to store the directory from the server computing device to the token device. This may enable the user to manage the private data on the token device while offline. In an embodiment, the user may decide to manage the private data while still online (i.e., the wireless connection between the token device and the server computing device is still established). If this occurs, the token device may then perform operation 418 to generate a unique compressed uniform resource locator (URL) each time a link, which corresponds to the compressed URL, is selected by a user to open the directory of private data in a browser. This may be performed to hide the presence of URL footprints such that unauthorized users may not be able to track the directory names or other sensitive information. In one embodiment, after the user has retrieved data from a root directory, the user may only be able to access additional directories (e.g., sub-directories) using the above process. Accordingly, if the user needs additional directories according to operation 412, operations 404, 406, 408, 418, and 410 may need to be repeated. According to an embodiment in operation 414, the token device may be configured to alter how much of the total storage capacity is visible using the public storage feature and how much of the total storage capacity is not visible using the private storage feature.

Operation 404 occurs when a user generates a root directory name (e.g., enters a root directory folder name to create a new directory on the token device) on the token device drive and a request is made by the token device to retrieve a corresponding directory from a server computing device. The directory name corresponds to a directory that contains one or more desired private data files. When the user inserts the token device into the computing device in operation 402, the user may open the token device drive (e.g., open the local disk E with the USB token device connected) and view an empty drive (e.g., the public storage capacity display future showing no data as being stored). In an embodiment, to view any of the private data, the user must generate or manually type in a directory name on the token device drive. In an embodiment, the directory name is a password used to authenticate the user's identity for retrieving private data from the server computing device. In another embodiment, the directory name is a password used to authenticate the user's identity for retrieving private data stored on the token device. The root directory name that the user generates may be the root directory. A root directory is the top hierarchical folder that houses other sub-directories and all of the data files. In various embodiments, each time the user wants to access different directories that correspond to different private data files, the user must generate the name of the corresponding directory, as discussed further below in operation 412.

In an embodiment, each time the user connects the token device with a computing device to retrieve data stored on the server computing device or token device, the user must generate a directory name regardless of whether or not directory names were generated previously. This may have different security conveniences. For example, if the token device is stolen, an unauthorized user may try to utilize the token device to retrieve data, but unless the unauthorized user knows and generates the directory name, the user will only be able to view an empty drive and not be able to retrieve any files from the directory. Further, in an embodiment, generating the directory name on the token device may be the only way to retrieve the desired data files. Accordingly, an unauthorized user may not be able to gain access to private data by simply trying different passwords to a cloud drive itself.

Operation 406 occurs when one or more server computing devices (e.g., node 10) communicates with the token device to authenticate the user's identity. Authentication of the user's identity may occur through various techniques using various application programs. An encryption engine of the token device may initiate encryption using various algorithms. For example, the encryption engine may encrypt the directory name before the token device sends the directory name to the server computing device to request the corresponding directory. The keying system of the token device may create and manage keys that encrypt or decrypt the directory name or directory files. In various examples, the algorithm the encryption engine of the token device utilizes may be an asymmetric algorithm type, such as RSA, DH, PGP or other algorithms. The asymmetric algorithm may be utilized with asymmetric keys. Asymmetric keys may include private and public keys. A private key is a string of alphanumeric text, which may in itself be encrypted, that a user keeps confidential that is used to encrypt or decrypt the directory name (i.e., the password) or files. In an embodiment, the private key may be stored on the token device. A public key is also a string of alphanumeric text, which may in itself by encrypted, that is revealed to outside sources and interacts with the user's private key to encrypt or decrypt the directory name or files. For example, a server computing device (e.g., node 10) may employ a public key stored on the server to interact with a user's private key. In this embodiment, the user's token device may send a request to the server computing device for the directory using the directory name along with a private key to encrypt the directory name. The server computing device may include a public key to authenticate the user's identity by decrypting the directory name and matching a signature that corresponds to the private key with the actual request.

In an alternative embodiment, the algorithm type may be a symmetric algorithm that is meant to be utilized with a symmetric key. The symmetric algorithm may be any number of algorithms such as triple DES, IDEA, AES, or other algorithms. For a symmetric key algorithm, only one key is utilized to encrypt and decrypt the directory name. For example, the token device may send a request for a directory using a root directory name stored on the server computing device. In this example, the token device may not include a private key and consequently, the directory name may be sent to the server computing device unencrypted. However, when the server computing device receives the request, the server computing device may employ a symmetric key to both encrypt and decrypt the request.

The encryption engine and keying system of the token device may be combined to form various methods of performing operation 406 to authenticate a user's identity using the generated directory name. In an embodiment, a public key infrastructure ("PKI") may be utilized to create, organize, store, distribute and maintain public keys. Accordingly, the encryption engine of the token device may generate asymmetric algorithms to authenticate a user's identity. In this embodiment, after the user generates root directory name with the token device connected to a computing device, the token device, with its wireless capability, may send a request (i.e., the directory name) to the server computing device for the directory that correspond to the user's generated directory name. This request may be coupled with a digital certificate that guarantees a user is an owner of private and public keys. A first server computing device, such as a certificate authority server may receive the request and determine whether the digital certificate is valid by checking with a second server computing device, such as a key server, to see if the digital certificate is in the second server computing device's list of trusted entities. If the digital certificate is not recognized, the connection may be dropped between the token device and the server computing devices. If the digital certificate is recognized, the PKI authentication system may validate the certificate. If the digital certificate is authorized, all of the private data from the root directory that corresponds to the user-generated directory name will be sent to and appear on the token device. Accordingly, the user may then be able to view and access the data files of the directory that corresponds to the first generated directory name.

In an embodiment, a first server computing device may create a session key, which may be a symmetric key, and encrypt the session key with a public key. The encrypted information may then sent back to a user. The private key stored on the token device may then be utilized to decrypt the information received from the server and extract the session key. The session key may be used to encrypt and decrypt data files that are sent back and forth between the server computing device and the user, whether through initially accessing data or storing data to the cloud drive.

In an alternative embodiment, a non-PKI authentication system may be utilized with keys that perform different functions than described above. For example, after the user generates a root directory name with the token device connected, the token device, with its wireless capability, may send a request to the server computing device (e.g., node 10) for all of the files that correspond to a directory of the user's first generated directory name. In this embodiment, the user's private key may be stored on the token device and may encrypt the message and directory name before the message is sent to the server computing device. The encrypted directory name along with the user's private key may be a digital signature. A server computing device may then decrypt the message and private key using a public key and compare the digital signature with the message to verify that there is a match between the directory name and private key for authentication. In other embodiments, a server computing device may compare the user's generated directory name with the corresponding directory name of files stored on the server computing device for authentication.

In an embodiment of operation 408, after a user receives the root directory that corresponds to the first generated directory name, the user may choose between managing the private data directly from a web browser, or may choose to simply synchronize the token device with the server computing device such that the user may manage the data files offline. If the user chooses to manage private data directly from a web browser, then a compressed URL generator from the token device may generate a unique compressed uniform resource locator ("URL") each time a link, which corresponds to the compressed URL, is selected to open the one or more data files in a browser. In an embodiment, after the user's identity is authenticated and the desired directory with the corresponding private data are on the token device, a link or shortcut icon may appear on the directory indicating that the user may open the cloud drive in a web browser that corresponds to a particular web page. The link may read "open cloud drive in browser," "manage data online," "online," or any suitable phrase indicating that the cloud drive may be opened in a web browser. The link may also be a graphic icon. In an embodiment, the link may appear on the root directory. In other embodiments, the link may appear on other sub-directories.

In an embodiment, the link corresponds to a compressed URL, also known as a "tinyurl," or "shortened URL." Logic within the token device and the cloud drive may change the compressed URL each time the link is selected to open the one or more data files in a browser. This process may occur in various manners. For example, a compressed URL generator of the token device may take an original long-form URL and convert it into a compressed URL. In one illustrative example, the compressed URL generator 310 may convert the long-form URL that is in base-n, into a base 36, 62, or any other appropriate base. One convenience of generating a compressed URL is that an unauthorized user may not be able to simply observe the URL address and request the associated directory of private data. The compressed URL may accordingly disguise the long-form URL address. Further, a convenience of the token device employing its own URL generator may be that a user does not have to rely on a third party service to generate compressed URLs.

In an embodiment, once a user selects the link to open one or more data files in a browser, logic in the token device may send the unique compressed URL to a browser along with a particular algorithm. When the browser performs a domain name lookup, a domain name server may interpret and verify the algorithm to know where to route the request to open the one or more data files in a browser. The domain name server may redirect the compressed URL such that a corresponding web page may now be available for the compressed URL. In this embodiment, a domain name service may need to know what algorithm is used and know what Internet Protocol (IP) address to route the request to.

Some browsers may save a history of all activities performed on the browser. Accordingly, a history footprint of URLs that correspond to web pages may be saved on the browser. One potential risk is that an unauthorized user may try to gain access to private data that are requested by an initial user by looking up the browsing history of the user. For example, if a user manages one or more private data files from a public computer and utilized the browser, a subsequent unauthorized user may try to track the browsing history to determine the link that corresponds to the location of the private data. In an embodiment of the present disclosure, if a subsequent unauthorized user found and selected the link that corresponds to the compressed URL and directory name, the domain name server may employ logic to verify that although the algorithm is a match, the algorithm was already used at a prior time. Consequently, the domain name server would not route the request to retrieve desired private data. The original valid user may keep requesting the data files as many times as desired from any location because the compressed URL generator may generate a different compressed URL each time a link is selected to open the one or more directories in a browser.

In an alternative embodiment, the compressed URL may correspond to a static URL or cloud drive. For example, when the user selects the link in which a compressed URL is generated, the user may be brought to a particular cloud service web page, and the cloud service's internal system may be responsible for directing all compressed URL data requests. In this example, the interpreter of the compressed URL may be the cloud service entity that houses the desired data files, as opposed to a third party domain name service. In this embodiment, having a particular cloud drive provider be responsible for directing all compressed URL data requests may decrease any dependency on outside domain name service entities to keep data files secure.

Figure 5:
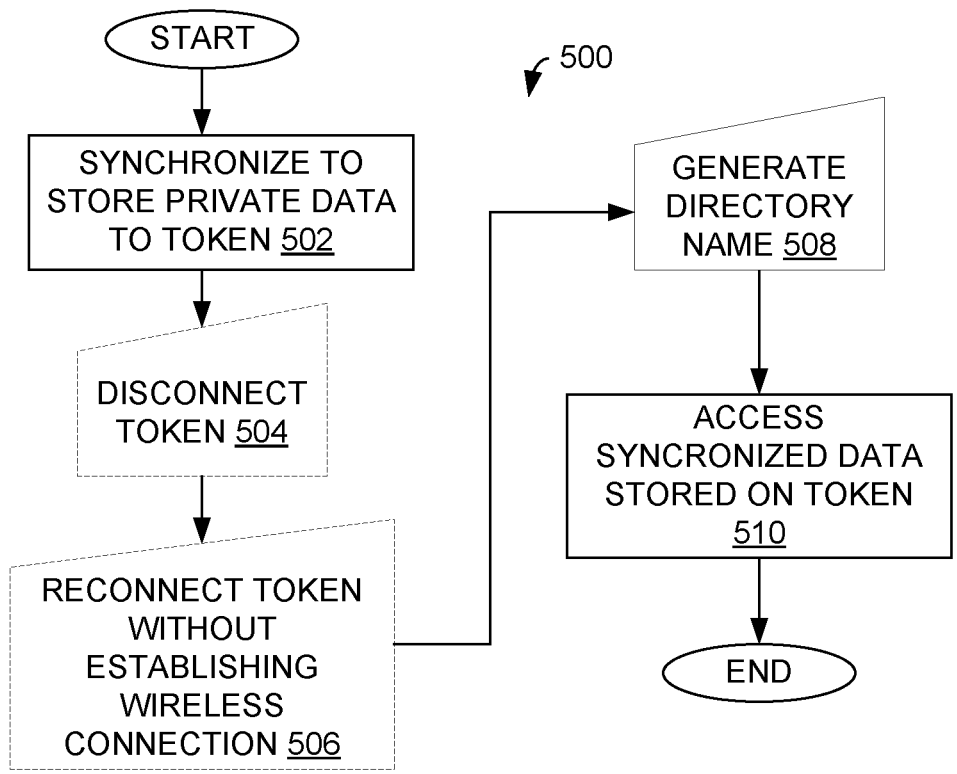
FIG. 5 is a flow diagram of an example process for accessing offline data that is stored on the token device, according to embodiments.

In operation 410, the token device may be synchronized with the server computing device to store the directory from the server computing device to the token device. This may enable the user to access the directory on the token device while offline. For example, FIG. 5 is a flow diagram of an example process 500 of accessing offline data that is stored on the token device. In an embodiment, after a server computing device authenticates a user's identity using a root directory name as part of operation 406, and the desired directory of files is returned to the user, the user may have an option to perform operation 502 to synchronize the token device with the server computing device to store the directory from the server computing device to the token device. In one embodiment, the user may then perform operation 504 to disconnect the token device from the computing device at a first time. The user may then perform operation 506 to re-connect the token device to another (or the same) computing device at a second time. In an embodiment, re-connecting the token device may be performed without establishing a wireless connection to a server computing device (e.g., turning a wireless capability switch off on the token device). In an embodiment, after the user re-connects the token device for operation 506, the token device may transfer information for display to the computing device. The information may describe public data stored on the token device. The wireless token may have the capability to communicate with the computing device operating system to make the private data not visible to users, even though the private data is stored on the token device. A user may then request a desired directory by performing operation 508 to generate a corresponding directory name on the token device drive. The token device may then receive the request to retrieve the directory (e.g., root directory) of private data stored on the token device, the request specifying a directory name that is used as a password to retrieve the directory stored on the token device. The token device may then authenticate the request for the directory by verifying that the directory name matches the root directory. The token device may then transfer the information in the directory stored on the token device to a display screen of the computing device. Operation 510 may then be performed to access the synchronized data stored on the token device.

The process 500 may strengthen the security measures for embodiments of the present disclosure. For example, an unauthorized user who steals the token device may still be required to know the directory name to retrieve any desired data files, even though the desired data files may be stored on the token device. Accordingly, the directory name may act as a password to retrieve any desired information from a server computing device or server.

In another embodiment, the user may simply desire to work offline without physically disconnecting the token device as specified in operation 504. For example, after a server computing device authenticates a user's identity using a directory name, and the desired directory is returned to the user, the user may synchronize the token device with the server computing device to store data files from the server computing device to the token device. The user may then turn off a wireless capability of the token device by pushing a power switch on the token device. The user may continue to manage any synchronized data files offline and later synchronize the token device with a server computing device to store offline data entries to the server computing device.

In yet another embodiment, after the server computing device authenticates a user's identity using a root directory name, and the corresponding root directory is returned to the user, the user may have an option to choose which sub-directories from a plurality of sub-directories to synchronize. In this embodiment the user may synchronize the token device with the server computing device to store specific directories, as opposed to all of the directories, from the cloud drive to the token device. For example, a user may access the private data from a first root directory, which includes a plurality of sub-directories. The user may not need all of the data files from all of the sub-directories. Accordingly, the user may only synchronize one or two sub-directories. However, in an embodiment, if the user needed data from any sub-directories, the user may have to generate a sub-directory name, as discussed more below. The option to choose which directories to synchronize may be useful for storage purposes. For example, a user may have large amounts of data stored on a server computing device, but only a limited amount of data storage capacity on the token device. Consequently, the user may have to choose which directories the user will store from the server computing device to the token device as part of the synchronization process.

Figure 6:
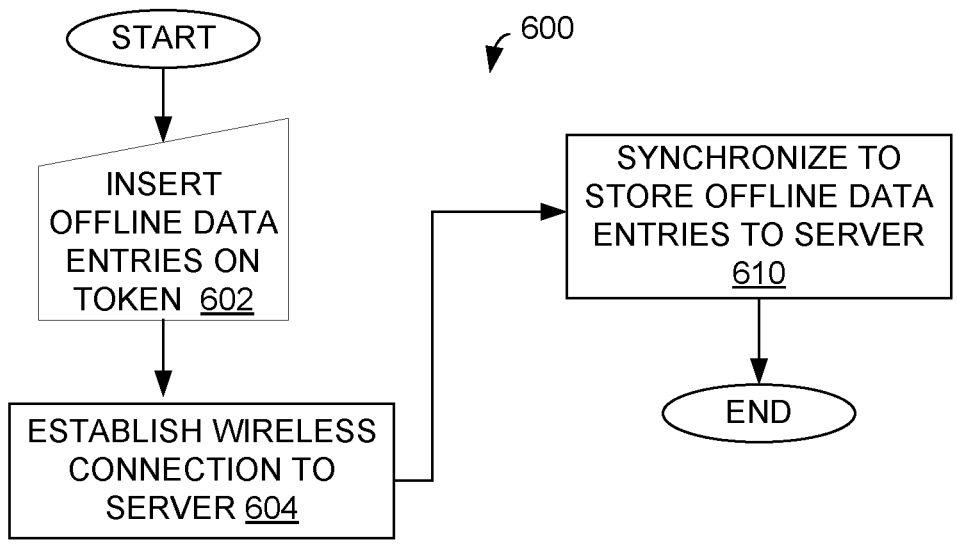
FIG. 6 is a flow diagram of an example process of generating offline data entries on a token device, and synchronizing to a server computing device to store the data entries to the server computing device, according to embodiments.

In another embodiment, the user may desire to insert and store private data to a token device while offline and later copy the data to a server computing device. FIG. 6 is a flow diagram of an example process 600 of generating offline data entries on a token device and synchronizing to a server computing device to store the data entries to the server computing device. In an example, the user may first initiate the process 600 by performing operation 602 to insert offline data entries on the token device. Accordingly, the wireless connection between the token device and the server computing device may be disconnected. The token device may then store and receive the offline data entries. At a different time, the token device may perform operation 604 to re-establish the wireless connection between the token device and the server computing device (e.g., through turning on a wireless connection power switch or re-connecting the token device). The token device may then perform operation 610 by synchronizing the token device with the server comput-ing device to store the offline data entries from the token device to the server computing device. In this embodiment, the synchronization may occur at substantially the same time as a token device establishes wireless connection to a server computing device (e.g., one or two seconds after the connection).

In an alternative embodiment, the synchronization may occur after a token device makes a request for a corresponding directory from a server computing device in which the offline data entries are synchronized to the corresponding directory. In this embodiment the user may generate the directory name on the token device drive that corresponds to the offline data entries. The server computing device may then authenticate the user's identity using any of the techniques as described in operation 404 by utilizing the directory name as a password to retrieve the corresponding directory. After authentication, the directory that corresponds to the generated directory name may become visible on the display screen of a computing device that the token device is connected to. The user may then drag the offline data entries into the corresponding directory that is visible on a computing device display screen. When the entries are dragged into the directories, a synchronization may occur such that new data entries generated offline may be copied and stored to the token device, and sent and stored to the server computing device.

In yet another embodiment, the user may generate a root directory name on the token device drive to retrieve the corresponding root directory. The server computing device may then authenticate the user's identity using any of the techniques as described in operation 404 by utilizing the directory name as a password to retrieve the corresponding directory. After authentication, the root directory that corresponds to the generated root directory name may become visible on the display screen of a computing device that the token device is connected to. Within the root directory may be a sub-directory with properties to store any offline data entries to the server computing device. The user may then drag (i.e. transfer) any quantity of offline data entries into the corresponding sub-directory of the root directory on the token device. When the offline data entries are dragged into the root directory, a synchronization may occur such that the transferring of the any quantity of offline data entries are stored to the server computing device and not the token device. There may be various advantages by not storing the offline data entries to the token device. For example, a user may drag 100 gigabytes of data onto a 10 gigabyte token device. But since the data will be dragged into a directory that synchs only to the server computing device, this data will not be stored to the token device. Accordingly, the user may not have to be concerned about the total storage capacity of the token device.

In operation 412, the user may decide whether to retrieve more private data from additional sub-directories. In one embodiment, if the user needs more private data, the user may repeat operations 404, 406, 408, and either 418 or 410. In an embodiment, if the user managed the data offline as part of operation 410, and needed to access additional directories from the server computing device, the token device may have to establish a wireless connection (e.g., via a power switch or connecting the token device in operation 402) with the server computing device. Accordingly, the token device may receive a request to retrieve a sub-directory of the root directory of private data, the request specifying a sub-directory name. In response to receiving the request to retrieve a sub-directory, the token device may request the sub-directory by transferring the sub-directory name to a server computing device. The sub-directory name may be used as a password to retrieve the sub-directory. The token device may then receive the sub-directory from the server computing device.

In an illustrative example, at a first time, a user may connect the token device in operation 402 to a computing device. The user may then generate (e.g., type) a root directory name one the token device drive and the token device may perform operation 404 to request the root directory using the root directory name as a password. A server computing device may then authenticate the user's identity as part of operation 406. The user may then decide to work online and select a link on the root directory, whereby compressed URLs are generated as part of operation 418. The root directory may contain all of the sub-directories. The user may then decide that it only needs data from two sub-directories. Accordingly, at a second time, the user may generate a sub-directory name on the token device drive that corresponds to the desired sub-directory. The token device, with its wireless access capability still activated, may request the sub-directory using the sub-directory name as a password to retrieve the sub-directory. One or more server computing devices may again authenticate the user's identity using the sub-directory name. The user may decide to still keep working online. At a third time, the user may decide that it wants data from a second sub-directory. Accordingly, the user would generate the corresponding second sub-directory name, data would be requested, and the user's identity would again be authenticated using the second sub-directory name to retrieve the second sub-directory.

In an embodiment, for every directory that a user needs to access, the user may have to generate the corresponding directory name to manage the private data. This may act as a hierarchical and layered password approach to secure sensitive data. For example, an unauthorized user may discover a sub-directory name (i.e., password), and may try to generate the sub-directory name with the token device connected to a computing device. However, in an embodiment, an unauthorized user would not be able to retrieve the private data because the user would have to know and generate a root directory name first to have access to the sub-directories. In an alternative example, the unauthorized user may discover the root directory name and try to access sub-directory data files accordingly. However, if the unauthorized user did not know the other sub-directory names, the unauthorized user would not be able to open the sub-directories to obtain additional private data. This hierarchical approach may effectively force unauthorized users to know every single directory password or name that corresponds to the desired directories, as opposed to an unauthorized user only having to know a single password to gain access to all the files of all of the directories. An additional useful feature of the hierarchical approach may be that each directory is not viewable or is hidden from an unauthorized user's view unless each directory name is generated.

In one embodiment, the token device may include a public storage engine to display a public storage. The display of the public storage may show a total storage capacity that is less than the actual total storage capacity of the token device and the display of the public storage may show only the public data stored on the token device. For example, when the user initiates the process for private data retrieval and connects the token device to the computing device, the user may view as part of the public data, an indicator that shows that half of a 64 gigabyte storage capacity remains. In this example, the actual storage capacity may be viewable such that the total storage capacity amount is public data. Accordingly, the public storage engine may not be utilized. In another example, even if half of a 64 gigabyte storage capacity remained on a token device, no indicator may be visible on the computing device display screen showing the storage capacity. In this example, the public storage engine may be utilized to conceal all of the total storage capacity on the token device.

In various embodiments and according to operation 314, the token device may be configured to alter how much of the total storage capacity is displayed for the public storage. For example, a token device may be a flash drive that includes a 64 gigabyte total storage capacity. The user may have used 32 of the 64 gigabytes. The user may decide that it only wants 500 megabytes available for public storage to show the total capacity. Accordingly, the public data shown on the display screen may only show a storage capacity of 500 megabytes. In various embodiments, the token device may communicate with the operating system of a computing device or data conceal engine of the token device to hide the presence of the remaining storage capacity. In another embodiment, an electronic display on the token device 222 may show that the token device only has a storage capacity of 500 megabytes, when in reality it has a storage capacity of 64 gigabytes. The actual display on the token device may be any sort of flag mechanism such as an electronic paper readout (ePaper readouts), meter, Light Emitting Diode (LED), or other electronic display. This public storage feature may be useful for several reasons. For example if an unauthorized user found the token device and saw that the token device only had a 500 megabyte storage capacity, when in reality the token device had a 64 gigabyte capacity, the unauthorized user may not steal the token device because of the low storage capacity.

Figure 7:
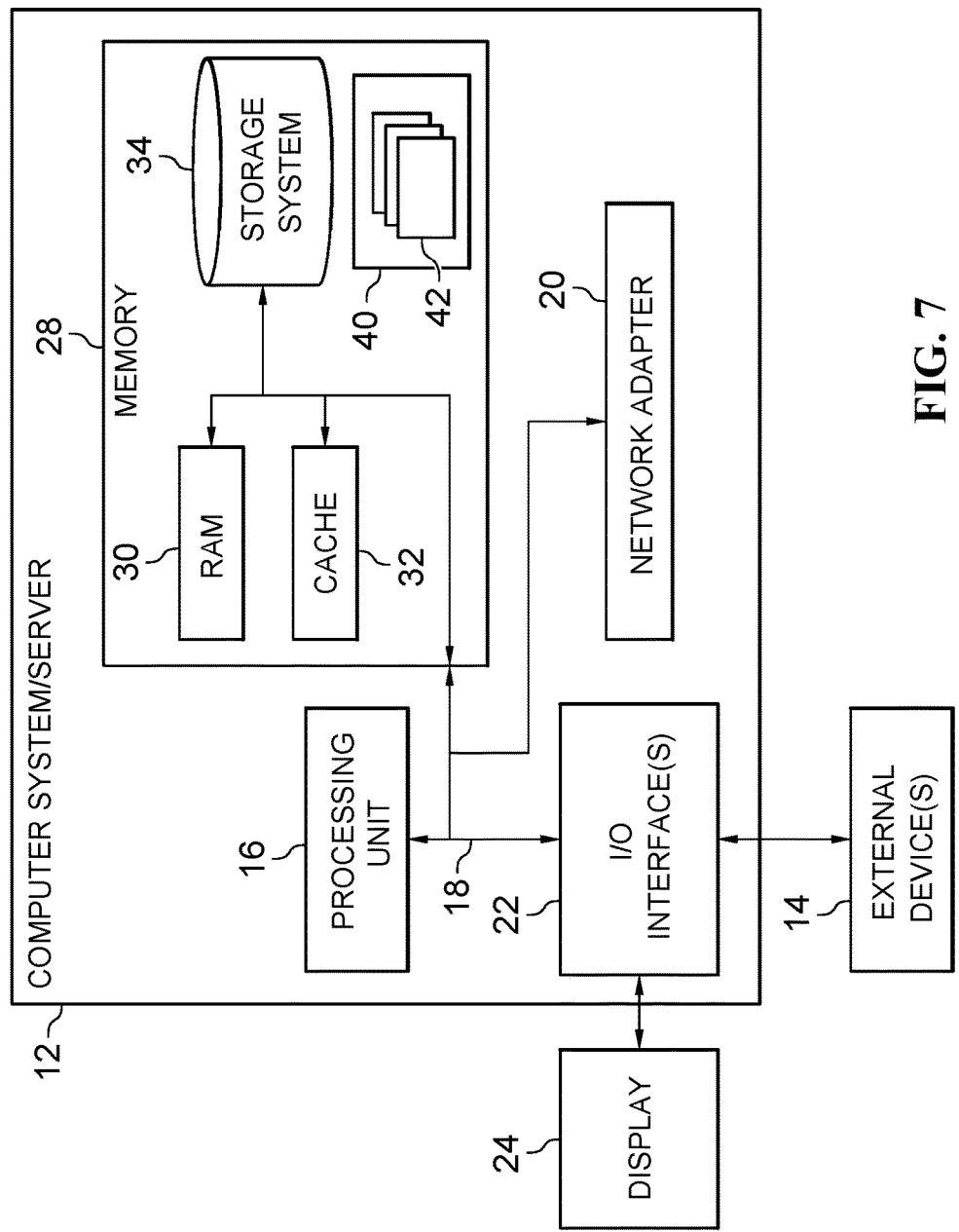
FIG. 7 depicts a cloud computing node according to an embodiment of the present invention.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
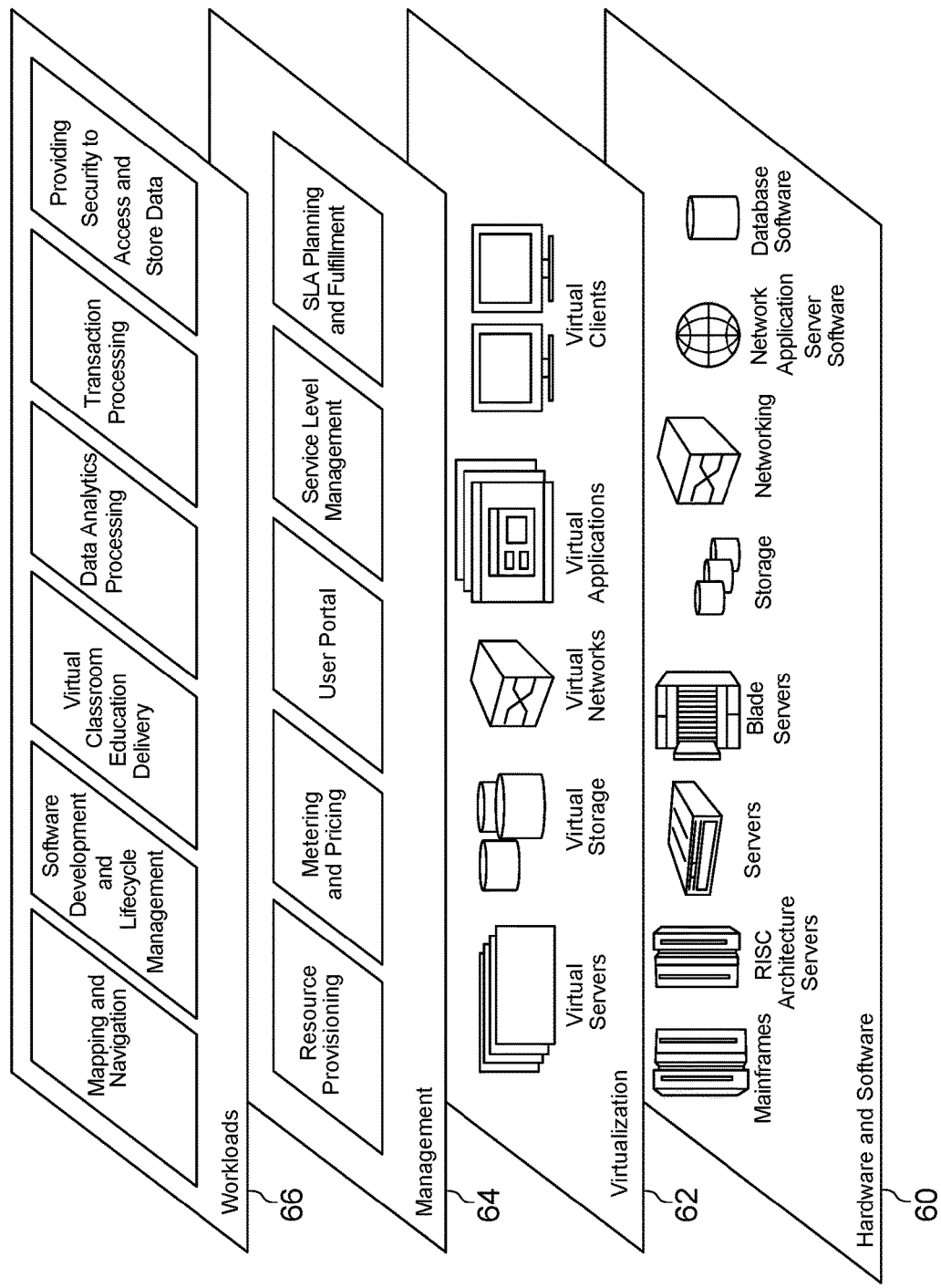
FIG. 8 depicts abstraction model layers according to an embodiment of the present invention.

Referring now to FIG. 8, a set of functional abstraction layers provided by cloud computing environment 50 (FIG. 1) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and providing security to access and store data.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for providing security to access and store data, the method comprising:
    transferring first information for display from a token device to a first computing device at a first time, the token device connected to the first computing device and the first information describing public data stored on the token device;
    concealing second information stored to the token device, the second information describes a plurality of directories of private data, wherein the second information is not displayed by the first computing device at the first time;
verifying that a user has generated one or more passwords to obtain one or more of the plurality of directories;
receiving a request to retrieve a directory of the one or more directories, the request specifying a directory name that is used as a password to retrieve the directory from the token device; and
transferring the directory of private data stored on the token device to a display screen of the first computing device.

2. The method of claim 1, wherein the one or more of the plurality of directories includes a root directory of private data, the method further comprising:
receiving a request to retrieve a sub-directory of the root directory of private data, the request specifying a sub-directory name; and
verifying that the sub-directory name has been generated in order to authenticate and authorize a user of the first computing device to retrieve contents of the sub-directory.

3. The method of claim 2, further comprising synchronizing the token device with a server computing device to store the root directory from the server computing device to the token device.

4. The method of claim 1, further comprising:
in response to receiving the request to retrieve the directory of private data stored on the token device, authenticating the request by verifying that the directory name matches the name of the directory.

5. The method of claim 1, further comprising:
receiving offline data entries by the token device, wherein a wireless connection between the token device and a server computing device is disconnected;
re-establishing the wireless connection between the token device and the server computing device; and
synchronizing the token device with the server computing device to store the offline data entries from the token device to the server computing device.

6. The method of claim 1, further comprising generating a unique compressed uniform resource locator (URL) each time a link, which corresponds to the compressed URL, is selected to open the one or more plurality of directories in a browser.

7. The method of claim 1, further comprising displaying a public storage, wherein the display of the public storage shows a total storage capacity that is less than an actual total storage capacity of the token device.

8. A token device for providing security to access and store data, comprising:
a private data conceal engine configured to transfer first information for display from the token device to a first computing device at a first time, the token device connected to the first computing device and the first information describing public data stored on the token device;
wherein the private data conceal engine is further configured to conceal second information stored to the token device, the second information describes a plurality of directories of private data, wherein the second information is not displayed by the first computing device at the first time;
an authentication engine configured to verify that a user has generated one or more passwords to obtain one or more of the plurality of directories; and
a cryptosystem configured to transfer the directory name to a server computing device, wherein the directory name is used as a first password to retrieve the directory from the server computing device.

9. The token device of claim 8, further comprising:
a radio configured to establish a wireless connection between the token device and the server computing device, wherein the token device receives a request to retrieve a directory of private data, the request specifying a directory name and in response to the receiving of the request, the token device requests the directory from the server computing device and receives the directory from the server computing device.

10. The token device of claim 9, wherein the directory is a root directory, the token device further comprising:
wherein the radio is further configured to receive a request to retrieve a sub-directory of the root directory of private data, the request specifying a sub-directory name, and in response to the receiving of the request, the token device requests the sub-directory from the server computing device and receives the sub-directory from the server computing device; and
wherein the cryptosystem is further configured to transfer the sub-directory name to the server computing device, wherein the sub-directory name is used as a second password to retrieve the sub-directory from the server computing device.

11. The token device of claim 9, wherein the radio is further configured to synchronize the token device with the server computing device to store the directory from the server computing device to the token device.

12. The token device of claim 8, further comprising a public storage engine configured to display a public storage, wherein the display of the public storage shows a total storage capacity that is less than an actual total storage capacity of the token device and the display of the public storage shows only the public data stored on the token device, wherein the token device is configurable to alter how much of the total storage capacity is displayed for the public storage.

13. A system comprising:
a first computing device having a processor;
a token device connected to the first computing device and
a computer readable storage medium having program instructions embodied therewith, the program instructions readable/executable by the processor to cause the system to perform a method, the method comprising:
transferring first information for display at the first computing device at a first time, the first information describing public data stored on the token device;
concealing second information that describes a plurality of directories of private data, wherein the second information is not displayed by the first computing device at the first time; and
verifying that a user has generated one or more passwords to obtain one or more of the plurality of directories of private data;
establishing a wireless connection between the token device and a server computing device, wherein the token device receives a request to retrieve a directory of private data, the request specifying a directory name and in response to the receiving of the request, the token device requests the directory from the server computing device and receives the directory from the server computing device; and transferring the directory name to the server computing device, wherein the directory name is used as a first password to retrieve the directory from the server computing device.

14. The system of claim 13, wherein the directory is a root directory, the method further comprising:
receiving a request to retrieve a sub-directory of the root directory of private data, the request specifying a sub-directory name, and in response to the receiving of the request, the token device requests the sub-directory from the server computing device and receives the sub-directory from the server computing device; and
transferring the sub-directory name to the server computing device, wherein the sub-directory name is used as a second password to retrieve the sub-directory from the server computing device.

15. The system of claim 13, the method further comprising synchronizing the token device with the server computing device to store the directory from the server computing device to the token device.

16. The system of claim 13, the method further comprising generating a unique compressed URL each time a link, which corresponds to a compressed URL, is selected to open the one or more plurality of directories in a browser.

17. The system of claim 13, the method further comprising displaying a public storage, wherein the display of the public storage shows a total storage capacity that is less than an actual total storage capacity of the token device and the display of the public storage shows only the public data stored on the token device, wherein the token device is configurable to alter how much of the total storage capacity is displayed for the public storage.

* * * * *